UNITED STATES PATENT OFFICE.

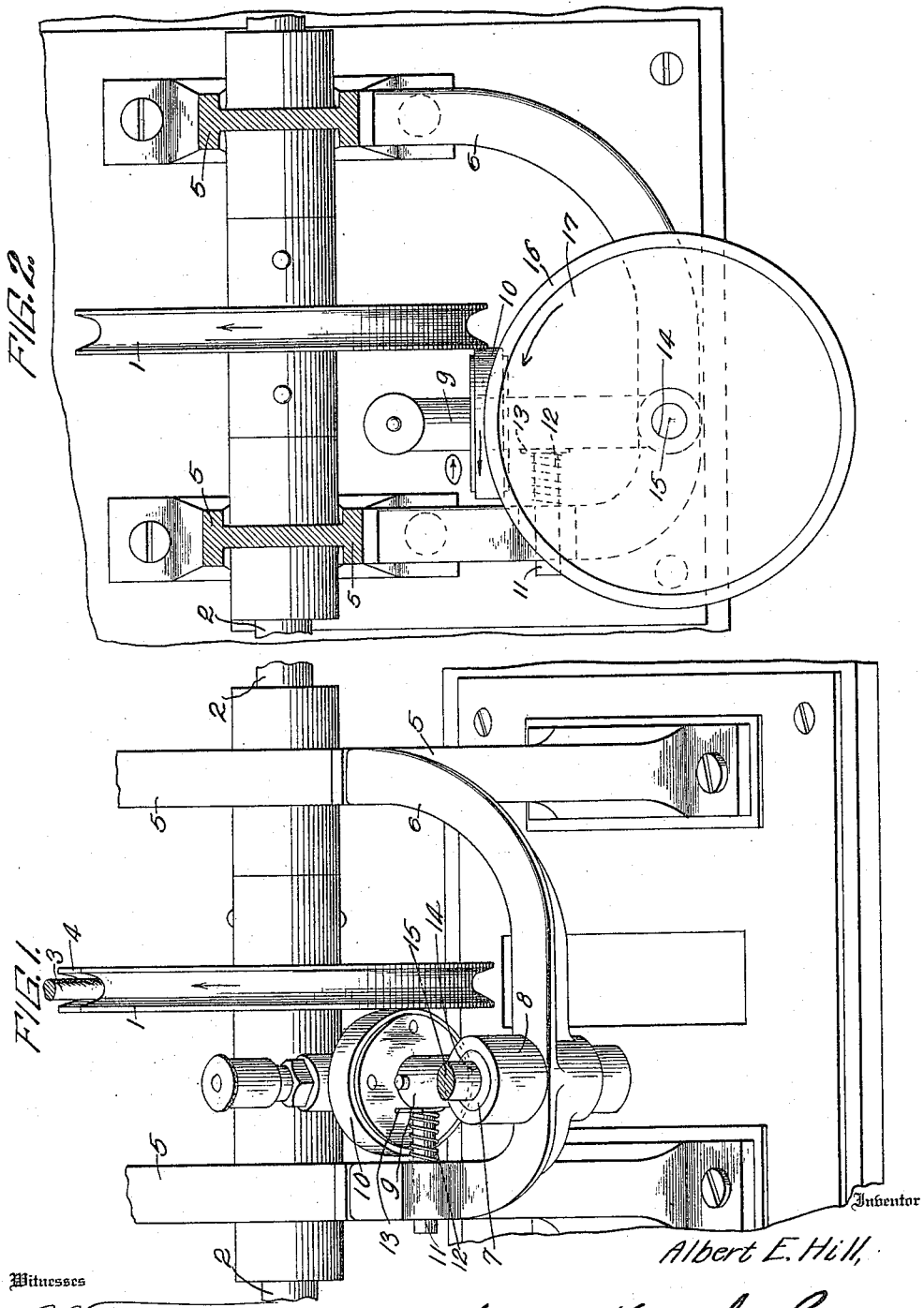

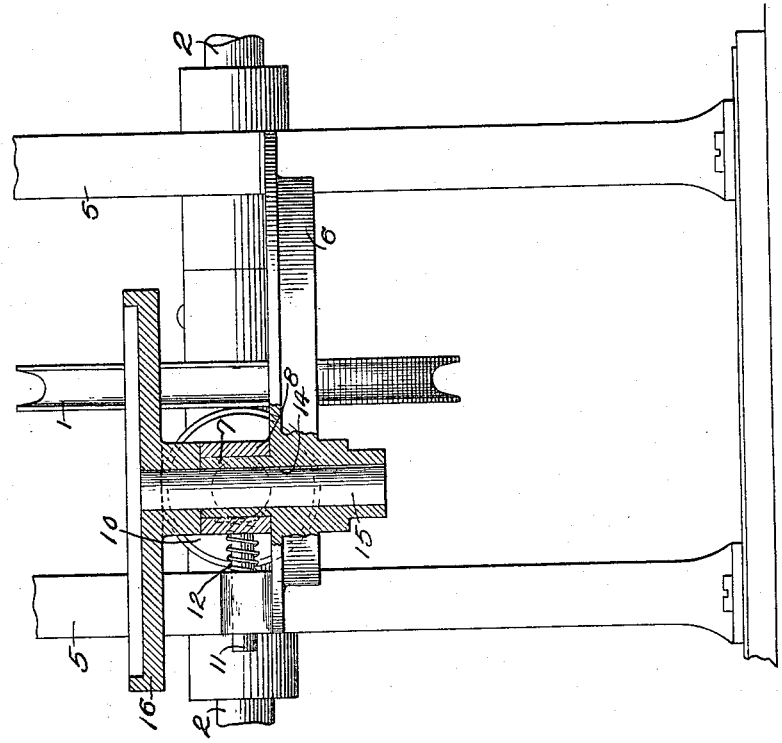

ALBERT E. HILL, OF ATLANTA, GEORGIA.

VARIABLE FRICTION-DRIVE.

1,168,210. Specification of Letters Patent. Patented Jan. 11, 1916.

Application filed December 26, 1914. Serial No. 879,166.

*To all whom it may concern:*

Be it known that I, ALBERT E. HILL, a citizen of the United States, residing at Atlanta, in the county of Fulton and State of Georgia, have invented certain new and useful Improvements in Variable Friction-Drives; and I do hereby declare the following to be a full, clear, and exact description of the invention, such as will enable others skilled in the art to which it appertains to make and use the same.

This invention relates to machine elements, and more especially to frictional driving mechanisms; and one object of the same is to produce a mechanism of this kind, especially adapted to grinding machines, and in which the friction idler has a changeable contact with the driver varied by the load thrown onto the driven element.

Another object of the invention is to provide a machine of this nature where the feed of the driving power will be automatic to the extent of furnishing additional power to rotate the honing table when increased pressure is brought to bear upon the table.

With these and other objects in view, the invention consists in certain novel constructions, combinations and arrangements of the parts as will be hereinafter fully described and claimed.

In the accompanying drawings wherein similar reference characters designate corresponding parts: Figure 1 is a perspective view of a portion of the complete machine showing in detail the driving mechanism for the hone table; Fig. 2 is a top plan view of the same; Fig. 3 is a vertical section through the hone table looking in the direction of the driving gear.

The general aim of this invention is to provide a rotatably mounted hone table driven by a friction wheel which is spring-pressed and normally engages the periphery of a driving wheel, as is common in friction drives, the distinction over other frictional drives, being that one friction member, namely, the "idler," engaging the driving wheel frictionally engages the second friction member or driven element, herein the hone table, and the latter has no direct connection whatsoever with the driving wheel. The friction wheel which engages the driving wheel however, is pivotally mounted to swing about the axis of the hone table so that any increased load on or pressure upon the hone table will throw the friction member engaging the driving member toward and in closer contact with said driving member.

In order that a more complete understanding may be had of the invention, reference is to be had to the drawings which show specifically the driving mechanism herein described and claimed as applied to a grinding machine.

Referring to the drawings, particularly Fig. 1, it will be seen that the driving wheel 1 is a groove pulley 1 mounted upon shaft 2 rotated by means of a cord belt 3 the tension of which may be varied by any suitable means, as by the belt tightener 4. This cord belt 3 may be driven in any manner as by an electric motor for convenience, although any means for moving the belt may be employed, or in fact any means may be employed for rotating the shaft 2. The standards 5 which carry bearings for the shaft 2 have extending therefrom a bracket 6 which has a boss or tubular bearing 7 rising from it. Around this boss is mounted a collar 8 carrying a swinging arm 9 upon the end of which is rotatably mounted a friction wheel 10. This friction wheel or idler stands in an upright plane at right angles to the driving wheel and is positioned so as to normally engage at or near the periphery thereof with a light contact just sufficient to drive the idler 10 without producing undue strain upon the motor or other means used for driving the shaft 2. Mounted on the bracket 6, is a guide rod 11 horizontally disposed and carrying a spring 12 which engages a projection 13 secured to the arm 9 for the purpose of swinging it and holding the idler resiliently against the driver. The bearing 7 is provided with a bore 14 which receives the upright stub shaft 15 of the driven element, herein a hone table 16, the periphery of which is flanged to receive a hone block or stone 17. The present invention is not concerned with the hone stone, nor with any substitute therefor, but aims to provide generally an abrasive means for honing razor blades. The hone table 16 rests near its periphery on and frictionally engages the friction wheel or idler 10 as seen in Fig. 3.

In the operation of the device referring to Fig. 2, it will be seen that normally the spring 12 is so adjusted as to hold the friction idler in light contact with the periphery of the driving wheel 15 so that the various rotating parts are moving in the direction indicated by arrows. Under normal running conditions where there would be no attempt to hone the blades the friction between the table 16 and friction idler 10 would be that due simply to the weight of the table and the stone; and, as before stated, the friction between driving wheel 1 and idler 10 would be a minimum due to spring 12. When pressure is brought to bear upon the stone 17, the pressure will serve to retard the motion of the hone table 16 so that the latter will not move quite as rapidly as it had moved previously, although the friction idler 10 which is contacting with the table 16, is still rotating at its normal or initial speed under the action of the drive wheel 1. The effect of this condition will be to cause the friction wheel 10 to move or creep through a slight arc under the periphery of the hone table 16 in the direction indicated by the inclosed arrow, as permitted by its swinging support, so that closer contact is made between the friction idler 10, and the drive wheel, thereupon immediately drawing additional power from the source driving the shaft 2. It will be readily understood that if the pressure upon the hone table remains constant for a time, the pressure between the drive wheel and the friction idler will remain the same as was the case when pressure was first applied to the hone table, but if any additional pressure be brought to bear upon the hone table 16, a still closer contact will be made between the driver and the idler. Upon release of the pressure on the hone stone 17, the spring 12 again acts alone to hold the idler or friction wheel 10 to normal position. Hence the feed of the driving power is automatic, although it is necessary for the attendant who is using the machine to exercise constant care and effort to grind the razor blades.

What I claim is:

1. A changeable driving mechanism comprising a driven element, a driving element, an idler normally in light engagement with both, and a movable support for said idler whereby its engagement with the driver is altered when a load is thrown onto the driven element.

2. A changeable driving mechanism comprising a rotary driven element, a rotary driving element, an idler wheel normally in light frictional engagement with both, and a movable support for said idler wheel whereby its engagement with the driver is altered when the movement of the driven element is retarded.

3. A changeable driving mechanism comprising a rotary driven element, a rotary driving element, an idler wheel normally in light frictional engagement with both, and a movable support for said idler wheel whereby its frictional contact with said driver is increased when a load is thrown onto the driven element.

4. A frictional driving mechanism comprising a rotary driver, a driven element, an idler wheel in constant engagement with said element, means for forcing it normally into light frictional engagement with the driver, and a movable support for said wheel whereby its frictional contact with said driver is increased when a load is thrown onto the driven element.

5. A frictional driving mechanism comprising a rotary driver, an idler wheel, means for forcing it normally into light frictional engagement with the driver, a driven element resting on the idler wheel, and a movable support for said wheel whereby its frictional contact with said driver is increased when a load is thrown onto the driven element.

6. A variable friction drive comprising driving and driven wheels, a friction idler contacting with both, a swinging support for the idler movable with respect to the driven wheel, and means for swinging the support to hold the idler normally in light contact with said driver.

7. A variable friction drive comprising driving and driven wheels, a friction idler wheel upon which the driven wheel rests, a swinging support for the idler mounted coaxially with the driven wheel, and a spring for swinging the support to hold the idler normally in light contact with said driver.

8. In a variable friction driving mechanism for grind stones and the like, the combination with a rotary table mounted on a vertical axis; of a driving wheel rotating in a plane at right angles to that of the table, an arm having a collar pivotally mounted around the axis of said table and beneath the latter, an idler wheel journaled on the arm and in constant contact with the under side of the table, a guide rod directed toward the driver, and a spring on the rod swinging said arm on its support to throw the idler normally into light contact with the driver, for the purpose set forth.

9. In a variable friction driving mechanism for grind stones and the like; the combination with a rotary table mounted on a vertical axis; of a driving wheel rotating in a plane at angles to that of the table, an arm pivotally mounted around the axis of said table and beneath the latter, an idler wheel journaled on the arm and in constant contact with the under side of the table, a framework having a bearing for the shaft of the table, a guide rod mounted in said framework, a projection on the arm opposite said rod, and an expansive spring surrounding the rod and engaging the projection and normally swinging the arm to throw the idler into light contact with the side of said driver, for the purpose set forth.

In testimony whereof I affix my signature in presence of two witnesses.

ALBERT E. HILL.

Witnesses:
CARRIE M. THOMSON,
LOIS THOMPSON.

Copies of this patent may be obtained for five cents each, by addressing the "Commissioner of Patents, Washington, D. C."